Patented Feb. 9, 1937

2,070,352

UNITED STATES PATENT OFFICE 2,070,352

MANUFACTURE OF ISATIN COMPOUNDS USEFUL FOR PROTECTION AGAINST MOTHS

Jakob Bindler, Basel, Switzerland, assignor to the firm J. R. Geigy S. A., Basel, Switzerland No Drawing. Application December 13, 1934, Serial No. 757,403. In Switzerland July 13, 1933

8 Claims. (Cl. 260—47)

This application is a continuation-in-part of the application Ser. No. 682,530, filed July 27, 1933.

The present invention relates to a manufacture of a new class of isatin condensation products useful for protection against moths. The manufacture consists in condensing 6-chloro-isatin-5-sulphonic acid with a substituted phenolic body of the benzene series of the general formula:

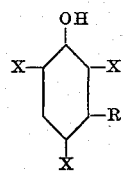

wherein X may stand for hydrogen or halogen and R for hydrogen or an alkyl group, such a phenolic body being for example para-chlorophenol, 6-chloro-meta-cresol and 2:4-dichlorophenol.

In order that the products may be soluble in water, either the condensation products, when insoluble, are sulphonated, or sulphonated components are used for the condensation.

The following example illustrates the invention, the parts being by weight:—

14 parts of 6-chloro-isatin-5-sulphonic acid and 13 parts of para-chloro-phenol having the formula:

are dissolved in 120 parts of concentrated sulphuric acid and the solution is stirred for 4 hours at 50–60° C. After the reaction mixture has been cooled it is diluted with water and subjected to steam distillation until no more para-chloro-phenol passes over. The product is salted out by the addition of potassium chloride, purified by recrystallization, neutralized with potassium carbonate and again precipitated. The dried product is a white powder which is soluble in water.

6-chloro-isatin can be made from meta-chloro-analine by the method of Sandmeyer (Helvetica Chimica Acta, vol. 2, page 234). By sulphonating this body in the nucleus by means of oleum of 20 per cent strength 6-chloro-isatin-5-sulphonic acid is obtained.

Instead of para-chloro-phenol, there can also be used in this example the corresponding quantity of 6-chloro-meta-cresol of the formula:

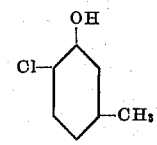

or 2:4-dichlorophenol of the formula:

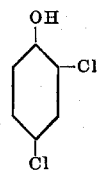

What I claim is:—

1. A manufacture of compounds useful for protection against moths, consisting in condensing 6-chloro-isatin-5-sulphonic acid with a substituted phenolic body of the benzene series of the general formula:

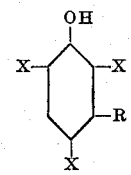

wherein X stands for one of the group consisting of hydrogen and chlorine, and R stands for one of the group consisting of hydrogen and methyl, wherein at least one of these substituents must be other than hydrogen.

2. A manufacture of compounds useful for protection against moths, consisting in condensing 6-chloro-isatin-5-sulphonic acid with para-chloro-phenol.

3. A manufacture of compounds useful for protection against moths, consisting in condensing 6-chloro-isatin-5-sulphonic acid with 6-chloro-meta-cresol.

4. A manufacture of compounds useful for protection against moths, consisting in condensing 6-chloro-isatin-5-sulphonic acid with 2-4-dichlorophenol.

5. As compounds for protection against moths the condensation products from 6-chloro-isatin-5-sulphonic acid and a substituted phenolic body of the benzene series of the general formula:

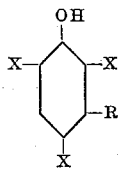

wherein X stands for one of the group consisting of hydrogen and chlorine, and R stands for one of the group consisting of hydrogen and methyl, wherein at least one of these substituents must be other than hydrogen.

6. As compounds for protection against moths the condensation products from 6-chloro-isatin-5-sulphonic acid and para-chloro-phenol.

7. As compounds for protection against moths the condensation products from 6-chloro-isatin-5-sulphonic acid and 6-chloro-meta-cresol.

8. As compounds for protection against moths the condensation products from 6-chloro-isatin-5-sulphonic acid and 2:4-dichlorophenol.

JAKOB BINDLER.